(12) United States Patent
Yeo

(10) Patent No.: US 8,643,324 B2
(45) Date of Patent: Feb. 4, 2014

(54) PORTABLE AUXILIARY POWER-SOURCE DEVICE FOR A VEHICLE

(75) Inventor: Chang Eun Yeo, Seoul (KR)

(73) Assignee: N Navi Solution, Seoul (KR)

( * ) Notice: Subject to any disclaimer, the term of this patent is extended or adjusted under 35 U.S.C. 154(b) by 225 days.

(21) Appl. No.: 13/147,059

(22) PCT Filed: Feb. 1, 2010

(86) PCT No.: PCT/KR2010/000587
§ 371 (c)(1),
(2), (4) Date: Jul. 29, 2011

(87) PCT Pub. No.: WO2010/087661
PCT Pub. Date: Aug. 5, 2010

(65) Prior Publication Data
US 2011/0279089 A1   Nov. 17, 2011

(30) Foreign Application Priority Data
Feb. 2, 2009   (KR) .......... 10-2009-0008161

(51) Int. Cl.
*H02J 7/14* (2006.01)
*H02J 7/00* (2006.01)

(52) U.S. Cl.
USPC ........... 320/105; 320/104; 320/107; 320/114; 320/115

(58) Field of Classification Search
CPC ............ H02J 7/0034; Y02T 10/7005
USPC ................................. 320/104, 105
See application file for complete search history.

(56) References Cited

U.S. PATENT DOCUMENTS

| 2005/0040788 A1 | 2/2005 | Tseng |
| 2005/0280979 A1 | 12/2005 | Wu |
| 2007/0052387 A1 | 3/2007 | Yen et al. |
| 2007/0285049 A1* | 12/2007 | Krieger et al. ............... 320/105 |
| 2008/0224661 A1* | 9/2008 | Onose .......................... 320/115 |

FOREIGN PATENT DOCUMENTS

| KR | 1993-0017263 A | 8/1993 |
| KR | 20-0191129 Y1 | 5/2000 |
| KR | 20-0233779 Y1 | 5/2001 |
| KR | 1020060022722 A | 3/2006 |
| KR | 1020060022722 * | 10/2006 ............... H02J 7/04 |
| KR | 100834530 B1 | 5/2008 |

OTHER PUBLICATIONS

International Search Report, Application No. PCT/KR2010/000587, dated Sep. 14, 2010.

* cited by examiner

*Primary Examiner* — Edward Tso
*Assistant Examiner* — Ahmed Omar
(74) *Attorney, Agent, or Firm* — Kile Park Reed & Houtteman PLLC

(57) ABSTRACT

The present invention relates to a portable auxiliary power-source device for a vehicle, and more specifically to a portable auxiliary power-source device which incorporates a rechargeable battery and is able to temporarily charge while the vehicle's battery is discharging, and is able to effect ignition of the vehicle and charge portable, personal digital devices.

6 Claims, 5 Drawing Sheets

PORTABLE AUXILIARY POWER-SOURCE DEVICE FOR A VEHICLE

TECHNICAL FIELD

The present invention relates to a portable auxiliary power-source device for a vehicle, and more particularly, to a portable auxiliary power-source device for a vehicle built with a rechargeable battery and having output terminals for outputting different voltages.

BACKGROUND ART

In general, as means of using electricity have been increased, power supply has been further important. One of the representative means of using electricity is a vehicle. In general, electric power is used to start up the vehicle, and the electric power is also used for various apparatuses installed in the vehicle. Therefore, a vehicle battery is built in order to supply the power.

The vehicle battery is applied with a power to be charged in advance and has a function of outputting the charged power at a needed time. The vehicle battery has a limitation of a predetermined power. Therefore, if the charged power is completely discharged, the vehicle battery cannot output the power any more due to the discharging. Accordingly, it is inconvenient to maintain the vehicle battery in the state where the battery is always charged at a constant level or more.

As a general method of temporarily charging the aforementioned vehicle of which the battery is discharged, the battery is charged by applying the power output from the battery of another vehicle. However, in this case, the separate vehicle of which the battery is charged is needed, the bonnets of the two vehicles are opened, and the batteries of the two vehicles are connected by using a separate cable. Therefore, the charging process is very inconvenient. In order to solve the problem described above, a portable vehicle battery charger is used. However, there is a problem in that the aforementioned portable vehicle battery charger is useless during the period when the vehicle battery is normally charged.

DISCLOSURE

Technical Problem

The present invention is to provide a portable auxiliary power-source device for a vehicle which is built with a rechargeable battery and has a plurality of output terminals of outputting different voltages so as to be capable of temporarily charging a vehicle battery at a discharged time of the vehicle battery and charging a personal portable digital apparatus at a normal time.

Technical Solution

According to an aspect of the present invention, there is provided A portable auxiliary power-source device for a vehicle including: an input unit which is input with an external power; a charging circuit unit which increases a voltage of the power input through the input unit; a battery unit which is input with the power of which the voltage is increased by the charging circuit to be charged and outputs the charged power at a needed time; a voltage dropper which decreases a voltage of the power output from the battery unit; a discharging circuit unit which limits a current of the power output from the battery unit; a first output unit which is input with the power output from the discharging circuit and outputs the power; a second output unit which is input with the power output from the voltage dropper and output the power; and a protection circuit unit which has a function of disconnecting a circuit according to a state of the battery unit so as to prevent an incorrect operation of the battery unit.

In addition, the portable auxiliary power-source device for the vehicle may further include a battery remaining amount display unit which checks a charging state of the battery unit and displays the state on a display apparatus.

In addition, the charging circuit unit may include: a voltage booster which increases a voltage of the input power; a charging current controller which measures a current and limits the applied current; a charging current comparative voltage generator which generates a comparative voltage; a charging current comparator which compares the applied voltage with the comparative voltage; a charging state comparator which compares the charging state of the battery unit based on the applied power; and a charging state display unit which displays a result of the comparison of the charging state comparator.

In addition, the discharging circuit unit may include: a discharging current comparative voltage generator which generates a comparative voltage; a discharging current comparator which compares a voltage measured from the applied power with the comparative voltage; and a discharging current controller which limits a current output from discharging current comparator.

In addition, the voltage dropper may include a voltage dropping circuit controller which decreases a voltage of the applied power.

In addition, the battery remaining amount display unit may include a display unit comparator which compares a voltage output from the battery unit with a comparative voltage.

In addition, a USB socket may be additionally provided to the second output unit.

Advantageous Effects

According to the present invention, a rechargeable battery is built in and powers having different voltages are output, so that it is possible to simultaneously perform charging of a vehicle battery and charging of electronic apparatuses using low voltages.

In addition, voltages of a battery unit are configured to correspond to the vehicle battery, so that a separate voltage boosting circuit is not needed.

In addition, a protection circuit unit is provided, so that an incorrect operation of the battery can be prevented.

BEST MODE

Hereinafter, preferred embodiments of the present invention will be described in detail with reference to the accompanying drawings.

Figure 1:
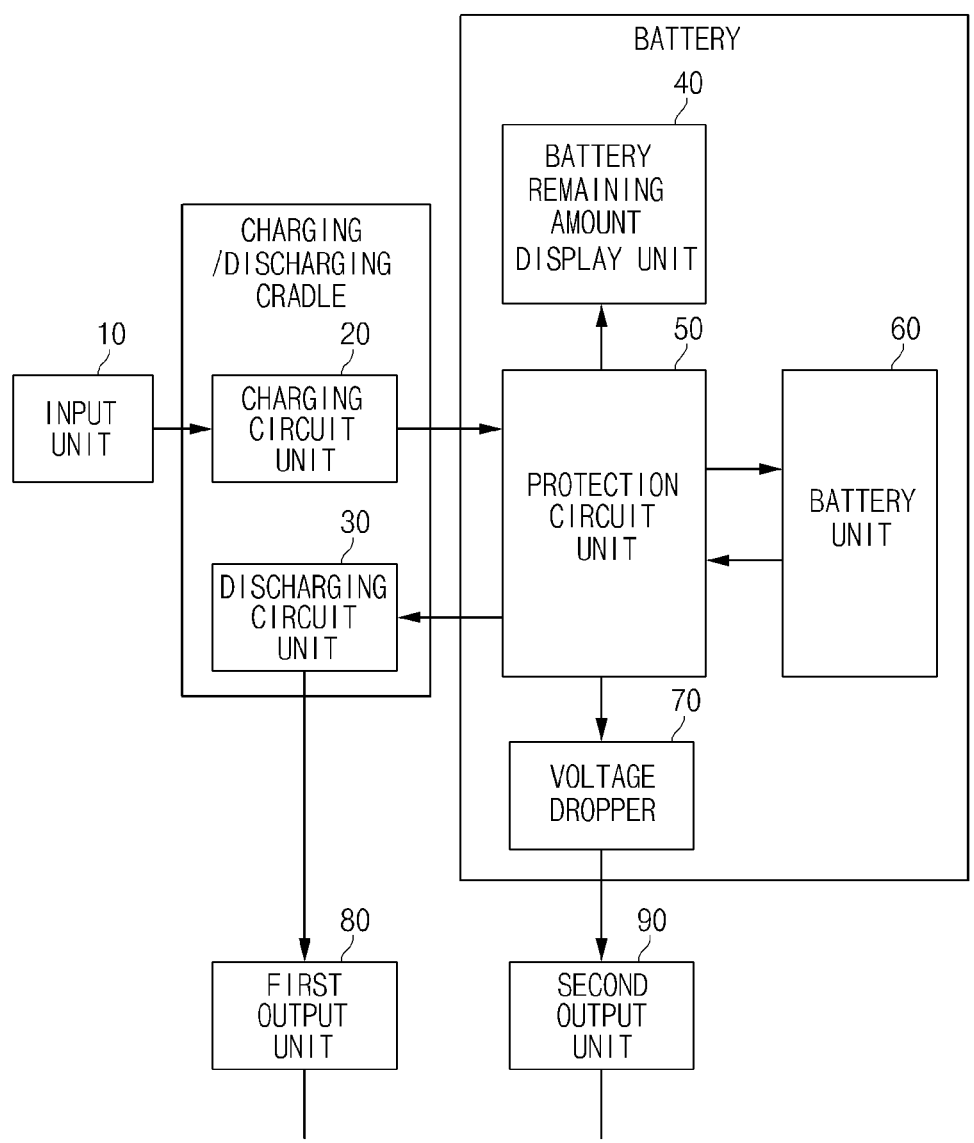
FIG. 1 is a block diagram illustrating a portable auxiliary power-source device for a vehicle according to a preferred embodiment of the present invention.

FIG. 1 is a block diagram illustrating a portable auxiliary power-source device for a vehicle according to a preferred embodiment of the present invention.

As illustrated in the figure, the portable auxiliary power supply apparatus according to the present invention includes an input unit 10, a charging circuit unit 20, a discharging circuit unit 30, a battery remaining amount display unit 40, a protection circuit unit 50, a battery unit 60, a voltage dropper 70, a first output unit 80, and a second output unit 90. The input unit 10 has a function of receiving external power and supplying power to the charging circuit unit 20. The input unit 10 may receive power through, for example, a cigar jack for a vehicle or an AC/DC adaptor. In this case, the input voltage is preferably in a range from 12V to 15V.

The charging circuit unit 20 has a function of controlling voltage so that the power supplied through the input unit 10 is charged to the battery unit 60 according to the present invention. Therefore, the charging circuit unit 20 is constructed with a circuit for controlling power. Since the battery unit 60 according to the present invention uses a voltage higher than the power voltage applied through the input unit, the charging circuit unit 20 preferably has a function of increasing the supplied power voltage. For example, the charging circuit unit 20 increase the power voltage of from 12V to 15V supplied through the input unit 10 to the voltage of 16.8V corresponding to the battery unit 60.

The protection circuit unit 50 has a function of protecting a circuit so that the portable auxiliary power supply apparatus according to the present invention is stably operated. The protection circuit unit 50 has a function of receiving the power of 16.8V increased by the charging circuit unit 20 and transmitting the power to the battery unit 60 and a function of transmitting the power output from the battery unit 60 to the discharging circuit unit 30 or the voltage dropper 60.

On the other hand, the protection circuit unit 50 has a function of preventing occurrence of abnormal phenomenon such as abnormal charging, abnormal discharging, short-circuit, and over-current at the charging or discharging time of the battery unit 60. Since the portable auxiliary power supply apparatus according to the present invention is a portable apparatus, an impact may be exerted thereto, and due to careless use thereof, the aforementioned abnormal phenomenon is highly likely to occur. Therefore, it is preferable that the aforementioned phenomenon be avoided by using the protection circuit unit 50 which is constructed with a kind of a protection circuit module (PCM).

In addition, the protection circuit unit 50 also has a function of controlling balance of the battery unit 60. The battery unit 60 is constructed by serially connecting four lithium ion batteries. However, at the charging time, the powers transmitted to the batteries may have difference therebetween. Therefore, the protection circuit unit 50 has a function of transmitting a constant power to the batteries.

The battery unit 60 is constructed by generally-used rechargeable batteries, preferably lithium ion batteries, so that the battery unit 60 has a function of charging the power by using the batteries. However, the battery unit 60 may be constructed by using other rechargeable batteries such as lithium polymer batteries other than the aforementioned lithium ion batteries. In addition, the battery unit 60 has a function of receiving the power transmitted from the protection circuit unit 50 and charging the power. Preferably, the battery unit 60 is constructed by serially connecting four lithium-ion cells so that the battery unit 60 outputs a power of 16.8V at the fully charged time. On the other hand, as described above, the battery unit 60 has a function of receiving a power input in advance to be charged and outputting the charged power at a needed time. The power output from the battery unit 60 is applied to the protection circuit unit 50. The battery unit 60 outputs the power having a constant current and a constant voltage according to the characteristics of the lithium ion batteries.

The voltage dropper 70 has a function of receiving the power output from the protection circuit unit 50 and decreasing the voltage. For example, the voltage dropper 70 decreases the voltage of 16.8V of the power output from the protection circuit unit 50 into 5V and transmits the power to the output unit.

The discharging circuit unit 30 has a function of limiting the maximum current when outputting the charged power in order to charge a vehicle or an electronic apparatus in the state where the battery unit 60 is fully charged. Therefore, due to the discharging circuit unit 30, it is possible to avoid a current larger than a predetermined amount from being flowed into. For example, the discharging circuit unit 30 is preferably configured so as to limit the output current to the maximum current of 7 A.

The battery remaining amount display unit 40 has a function of displaying the charging state of the battery unit 60. In other words, the battery remaining amount display unit 40 has a function of checking the remaining amount of the power charged in the battery unit 60 and displaying the remaining amount through display means. Therefore, the battery remaining amount display unit 40 preferably includes the display means, for example, an LED (Light-Emitting Diode). More preferably, the battery remaining amount display unit 40 is configured so as to compare the charged state of the battery and to display various colors by using a plurality of the display means. For example, it is preferable that the battery remaining amount display unit 40 blinks a green LED when the battery unit 60 is fully charged and blinks a red LED when the battery unit 60 is charging, so that the remaining amount of the power of the battery unit 60 can be displayed.

The first output unit 80 has a function of outputting the power through the discharging circuit unit 30. In other words, the first output unit 80 may output the power having a voltage of 16.8V. Preferably, the first output unit 80 may be connected to a separate cable connected to a vehicle cigar jack.

The second output unit 90 has a function of outputting the power through the voltage dropper 60. In other words, the second output unit 90 may output the power of which the voltage is decreased to 5V. A USB socket is additionally provided to the end portion of the second output unit 90 so that electronic apparatuses using a voltage of 5V can be connected thereto.

Hereinafter, operations of the portable auxiliary power-source device for the vehicle having the above-described configuration according to the preferred embodiment of the present invention will be described.

First, a power is applied to the input unit 10. As described above, the input unit 10 is configured so as to be connected to an output terminal of a typical AC/DC adaptor or a cigar jack of a vehicle. The power having a voltage of 12V to 15V output from the AC/DC adaptor or the cigar jack of the vehicle is applied thereto.

The power applied to the input unit 10 is transmitted to the charging circuit unit 20. The voltage of the power applied to the charging circuit unit 20 is regulated. In other words, the voltage of 12V to 15V applied to the input unit 10 is increased to the voltage of 16.8V which is used for the battery unit 60 according to the present invention. The power of which the voltage is regulated in the charging circuit unit 20 is applied to the protection circuit unit 50.

The power applied to the protection circuit unit 50 is applied to the battery unit 60 to be charged in the rechargeable batteries built in the battery unit 60. At this time, the protection circuit unit 50 detects the charging amount of the battery unit 60 to control the battery unit 60 so that, although the power continues to be input in the state where the battery unit 60 is fully charged, the battery unit 60 is not over-charged.

On the other hand, if an apparatus is connected to the first output unit 80, the battery unit 60 outputs the power. A vehicle battery may be connected to the first output unit 80. Preferably, the vehicle battery and the first output unit 80 according to the present invention may be connected through a separate cable connected to a cigar jack of the vehicle. Therefore, when the vehicle battery is charged by using portable auxiliary power supply apparatus according to the present invention, the battery is configured so as to be charged through the cigar jack of the vehicle, so that it is possible to simply charge the battery.

Similarly, the power output from the battery unit 60 has a voltage of 16.8V. As described above, the output power is applied through the protection circuit unit 50 to the discharging circuit unit 30. The maximum current of the power applied to the discharging circuit unit 30 is limited, and the limited power is applied to the first output unit 80.

The power transmitted to the first output unit 80 is applied through the connected cable to the cigar jack of the vehicle, so that the vehicle battery is charged.

On the other hand, if an apparatus is connected to the second output unit 90, the battery unit 60 outputs the power. The apparatus which is to connected to the second output unit 90 may be a general portable electronic apparatus, for example, various types of electronic apparatus such as an MP3 player or an electronic dictionary which is operated at a low voltage. The aforementioned portable electronic apparatus is generally applied with a power having a voltage of 5V to be operated. However, the power output from the battery unit 60 has a voltage of 16.8V. Therefore, the power output from the battery unit 60 is applied through the protection circuit unit 50 to the voltage dropper 70 in order to decrease the voltage thereof.

The voltage of 16.8 of the power applied to the voltage dropper 70 is regulated to a voltage of 5V, and the power of which the voltage is regulated is applied to the second output unit 90. The power applied to the second output unit 90 is applied to an apparatus connected to the second output unit 90.

Figure 2:
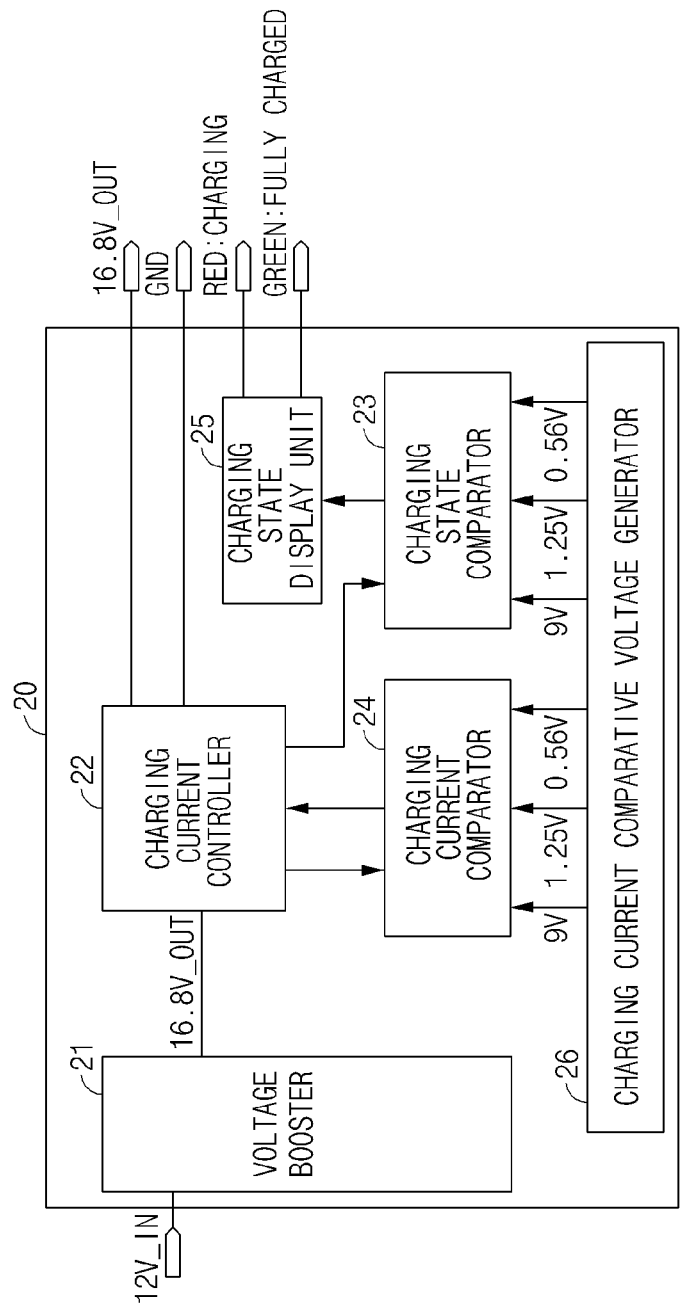
FIG. 2 illustrates a circuit constituting a charging circuit unit according to the preferred embodiment of the present invention.

FIG. 2 illustrates a circuit constituting the charging circuit unit according to the preferred embodiment of the present invention. Referring to this figure, the charging circuit unit 20 mainly includes a voltage booster 21, a charging current controller 22, a charging state comparator 23, a charging current comparator 24, a charging state display unit 25, and a charging current comparative voltage generator 26. The voltage booster 21 has a function of increasing the voltage of the input power. As described above, a power having a voltage of 12V to 15V is applied to the input unit 10 through a general AC-DC adaptor or a cigar jack of a vehicle. The applied power is supplied through the input terminal of the voltage booster 21. The power having a voltage of 12V to 15V supplied to the voltage booster 21 is increased to 16.8V through the voltage booster 21. The process is controlled by a PWM (Pulse Width Modulation) IC (Integrated Circuit) such as MC34063ACS. The power of which the voltage is increased is input to the charging current controller 22.

With respect to the applied power having a voltage of 16.8V, the current flowing through shut resistance is measured by the charging current controller 22, so that the current is limited. The shunt resistance is typically used so as to measure a current. In general, the shunt resistance is used in the case of measuring a large current with a small-scale current meter. The charging current controller 22 performs a control function by using a semiconductor chip max5078.

The charging current comparator 24 has a circuit configuration of comparing the input voltage with a comparative voltage. The comparative voltage used at this time is generated by the charging current comparative voltage generator 26. The charging state comparator 23 has a function of comparing the charging state based on the applied power, and the charging state display unit 25 has a function of displaying the charging state through a display apparatus.

Figure 3:
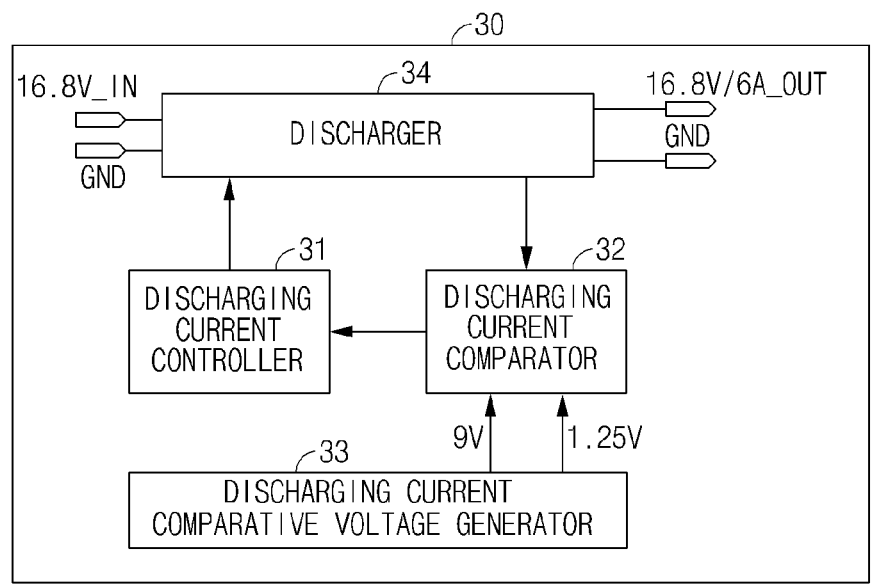
FIG. 3 illustrates a discharging circuit unit according to the preferred embodiment of the present invention.

FIG. 3 illustrates the discharging circuit unit according to the preferred embodiment of the present invention.

Referring to this figure, the discharging circuit unit 30 includes a discharging current controller 31, a discharging current comparator 32, a discharging current comparative voltage generator 33, and a discharger 34.

Referring to FIG. 1, the output terminal of the battery unit 60 is connected through the protection circuit unit 50 to the input terminal of the discharging circuit unit 30. Therefore, the power having a voltage of 16.8V output from the battery unit 60 is applied. Since the battery unit 60 according to the present invention uses four lithium ion battery cells, the power output from the battery unit 60 is high. Accordingly, the current is controlled to be limited by the discharging current controller 31. The value measured through the shunt resistance and the voltage generated by the discharging current comparative voltage generator 33 are compared by the discharging current comparator 32, so that the current is controlled. Preferably, the current is limited to the maximum current of 7 A.

The discharger 34 intermittently outputs the discharging current according to a control signal input from the discharging current controller 31.

Figure 4:
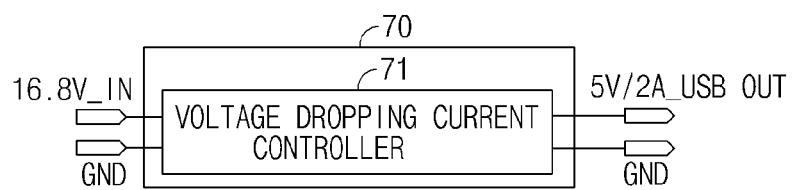
FIG. 4 illustrates a voltage dropper according to the preferred embodiment of the present invention.

FIG. 4 illustrates the voltage dropper 70 according to the preferred embodiment of the present invention. The voltage dropper 70 is a voltage drop circuit which receives the power of the battery unit 60 through the protection circuit unit 50 at the input terminal thereof and outputs the power having a voltage of 5V at the output terminal thereof. The voltage dropping circuit controller 71 illustrated in this figure may be embodied with a general voltage-drop converter IC. The output portion of the voltage dropping circuit controller 71 is preferably connected to a USB terminal. Accordingly, the power having a voltage of 5V output through the voltage dropping circuit controller 71 according to the present invention may be used for an apparatus which is input with a power through a USB which is generally widely used.

Figure 5:
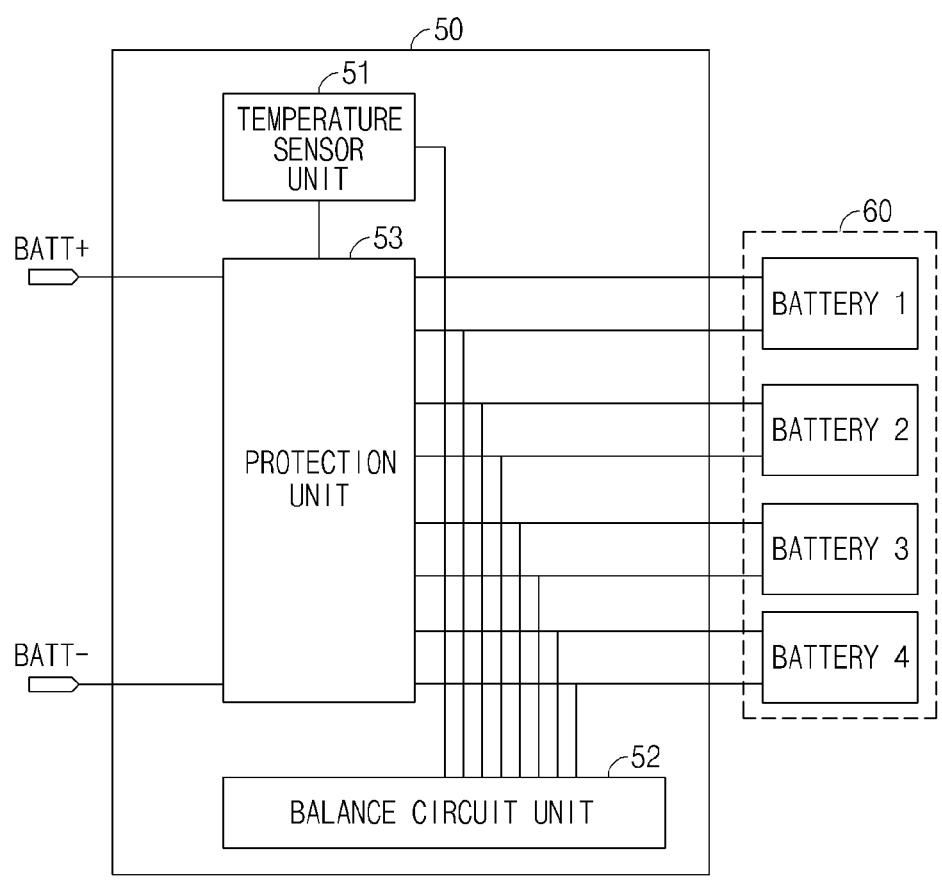
FIG. 5 illustrates a protection circuit unit according to the preferred embodiment of the present invention.

FIG. 5 illustrates the protection circuit unit according to the preferred embodiment of the present invention. As illustrated, the protection circuit unit 50 includes a temperature sensor unit 51, a balance circuit unit 52, and a protection unit 53. The temperature sensor unit 51 has a function of measuring a temperature of the battery and disconnecting the circuit when the temperature exceeds a predetermined level, so that it is possible to avoid the circuit from be damaged. The temperature sensor unit 51 may be set so that the circuit is disconnected when the temperature exceeds, for example, a temperature of 60 to 70 degrees. In addition, the protection circuit unit 50 includes the balance circuit unit 52. The battery unit according to the present invention is configured by a rechargeable battery constructed with four battery cells. However, when each of the battery cells outputs its power, the power of each of the battery cells may be different. Therefore, due to the balance circuit unit 52 according to the present invention, the balance of the battery cells is maintained, so that it is possible to prolong the life cycle of the battery.

In addition, in the case where the charging voltage exceeds a predetermined voltage (4.24V in the present invention, or the discharging voltage is less than a predetermined voltage (2.75V in the present invention), the protection unit 53 blocks the charging current or the discharging current, so that the over-charging or the over-discharging can be prevented.

Figure 6:
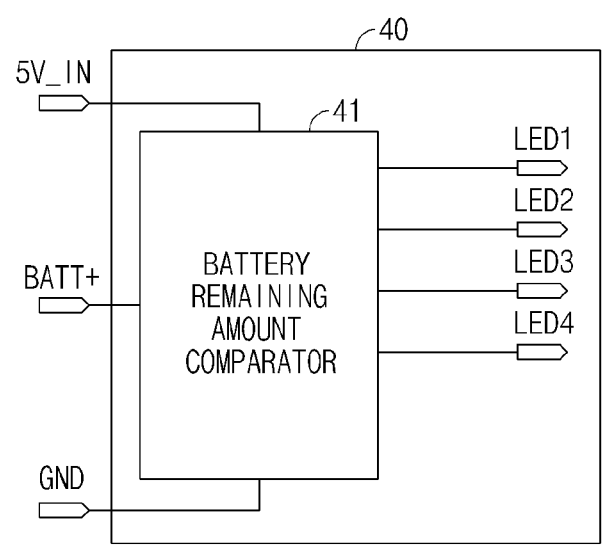
FIG. 6 illustrates a battery remaining amount display unit according to the preferred embodiment of the present invention.

FIG. 6 illustrates the battery remaining amount display unit 40 according to the preferred embodiment of the present invention. The battery remaining amount display unit 40 has a function of comparing the input power output from the battery unit 60 with the comparative voltages obtained by dividing VCC by resistance to measure the remaining amount of the battery and of displaying the remaining amount of the battery on a display unit constructed with an LED. At this time, the voltage comparison is controlled by the battery remaining amount comparator 41.

While the present invention has been particularly shown and described with reference to exemplary embodiment of a portable auxiliary power supply apparatus, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A portable auxiliary power-source device for a vehicle comprising:
   an input unit which is input with an external power;
   a charging circuit unit which increases a voltage of the power input through the input unit;
   a battery unit which is input with the power of which the voltage is increased by the charging circuit to be charged and outputs the charged power at a needed time;
   a voltage dropper which decreases a voltage of the power output from the battery unit;
   a discharging circuit unit which limits a current of the power output from the battery unit;
   a first output unit which is input with the power output from the discharging circuit and outputs the power;
   a second output unit which is input with the power output from the voltage dropper and output the power; and
   a protection circuit unit which has a function of disconnecting a circuit according to a state of the battery unit so as to prevent an incorrect operation of the battery unit;
   wherein the discharging circuit unit includes:
   a discharging current comparative voltage generator which generates a comparative voltage;
   a discharging current comparator which compares a voltage measured from the applied power with the comparative voltage; and
   a discharging current controller which limits a current output from discharging current comparator.

2. The portable auxiliary power-source device for the vehicle according to claim 1 further comprising a battery remaining amount display unit which checks a charging state of the battery unit and displays the state on a display apparatus.

3. A portable auxiliary power-source device for a vehicle comprising:
   an input unit which is input with an external power;
   a charging circuit unit which increases a voltage of the power input through the input unit:
   a battery unit which is input with the power of which the voltage is increased by the charging circuit to be charged and outputs the charged power at a needed time;
   a voltage dropper which decreases a voltage of the power output from the battery unit;
   a discharging circuit unit which limits a current of the power output from the battery unit;
   a first output unit which is input with the power output from the discharging circuit and outputs the power;
   a second output unit which is input with the power output from the voltage dropper and output the power; and
   a protection circuit unit which has a function of disconnecting a circuit according to a state of the battery unit so as to prevent an incorrect operation of the battery unit,
   wherein the charging circuit unit includes:
   a voltage booster which increases a voltage of the input power;
   a charging current controller which measures a current and limits the applied current;
   a charging current comparative voltage generator which generates a comparative voltage;
   a charging current comparator which compares the applied voltage with the comparative voltage;
   a charging state comparator which compares the charging state of the battery unit based on the applied power; and
   a charging state display unit which displays a result of the comparison of the charging state comparator.

4. The portable auxiliary power-source device for the vehicle according to claim 1, wherein voltage dropper includes a voltage dropping circuit controller which decreases a voltage of the applied power.

5. The portable auxiliary power-source device for the vehicle according to claim 1, wherein the battery remaining amount display unit includes a display unit comparator which compares a voltage output from the battery unit with a comparative voltage.

6. The portable auxiliary power-source device for the vehicle according to claim 1, wherein a USB socket is additionally provided to the second output unit.

* * * * *